US008955157B2

(12) United States Patent
Samson

(10) Patent No.: US 8,955,157 B2
(45) Date of Patent: Feb. 10, 2015

(54) METHOD AND APPARATUS FOR DIFFERENTIAL POWER ANALYSIS PROTECTION

(75) Inventor: John R. Samson, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 13/541,002

(22) Filed: Jul. 3, 2012

(65) Prior Publication Data

US 2014/0013425 A1   Jan. 9, 2014

(51) Int. Cl.
G06F 7/04 (2006.01)
G06F 17/30 (2006.01)
H04N 7/16 (2011.01)

(52) U.S. Cl.
USPC .......................................................... 726/30

(58) Field of Classification Search
CPC .............................. H04L 9/003; H04L 9/0612
USPC .................................. 726/22–23, 26–27, 30
See application file for complete search history.

(56) References Cited

U.S. PATENT DOCUMENTS

| 5,537,583 | A | 7/1996 | Truong |
| 5,548,404 | A | 8/1996 | Kupershmidt et al. |
| 6,839,868 | B1 * | 1/2005 | Pignol ............................. 714/42 |
| 7,200,822 | B1 | 4/2007 | McElvain |
| 2003/0084336 | A1 * | 5/2003 | Anderson et al. ............. 713/200 |
| 2011/0193589 | A1 | 8/2011 | Chua-Eoan et al. |
| 2011/0285420 | A1 * | 11/2011 | Deas et al. ....................... 326/8 |
| 2012/0204056 | A1 * | 8/2012 | Airaud et al. ................. 713/401 |

OTHER PUBLICATIONS

Blome et al., "Self-Calibrating Online Wearout Detection," Proc. 40th Annual IEEE/ACM International Symposium on Microarchitecture, IEEE CS Press, 2007, pp. 109-122.
Flammini et al., "A New Modeling Approach to the Safety Evaluation of N-Modular Redundant Computer Systems in Presence of Imperfect Maintenance," Reliability Engineering and System Safety 94 (2009), pp. 1422-1432.
Talkner et al., "Power Spectrum and Detrended Fluctuation Analysis: Application to Daily Temperatures," Physical Review E, vol. 62, No. 1, Jul. 2000, pp. 151-160.

(Continued)

*Primary Examiner* — Eleni Shiferaw
*Assistant Examiner* — Jing Sims
(74) *Attorney, Agent, or Firm* — Shumaker & Sieffert, P.A.

(57) ABSTRACT

This disclosure provides techniques for processing an input signal while providing protection from differential power analysis. In one example, random delay units may receive the input signal, a random delay generator may generate random delay values, and the random delay units may add the random delay values to the input signal to generate delayed signals, such that each delayed signal is substantially desynchronized relative to one or more other delayed signals. Subsequently, processing units may process the delayed signals to generate delayed output signals, and random delay removal units may add additional delay values to the delayed output signals, such that each delayed output signal is substantially synchronized relative to other delayed output signals, to produce output signals. Finally, a combination unit may combine the output signals to generate a common output signal that corresponds to the input signal that is processed by any one of the processing units.

17 Claims, 4 Drawing Sheets

(56) References Cited

OTHER PUBLICATIONS

Hartmann et al., "Noise Power Fluctuations and the Masking of Sine Signals," J. Acoust. Soc. Am. 83 (6), Jun. 1988, pp. 2277-2289.

Muharoglu et al., "On-Die Droop Detector for Analog Sensing of Power Supply Noise," IEEE Journal of Solid-State Cirucits, vol. 39, Issue 4, pp. 651-660, Apr. 2004, Abstract only.

* cited by examiner

METHOD AND APPARATUS FOR DIFFERENTIAL POWER ANALYSIS PROTECTION

TECHNICAL FIELD

This disclosure relates to techniques for making electronic devices more tamper resistant, and more particularly, to techniques for making electronic devices less susceptible to differential power analysis.

BACKGROUND

Differential power analysis (DPA) is a powerful analytic technique that can be used to extract information about how circuits process data. Many circuits process data by performing a series of operations on the data. As part of performing these operations, the circuit draws power from an external power source in a manner that generates a power signature. This power signature can be used to isolate specific intermediate operations that comprise a data processing algorithm. By isolating these intermediate operations, a potential attacker can gain an understanding of how the data processing algorithm operates, and in some instances, by gaining this understanding, the attacker can potentially reverse engineer the circuit, or in some instances, extract and decrypt encrypted information from the circuit.

An attacker, in this context, may be an engineer trying to gain an understanding of how a competing product functions, but in some instances, an attacker may have even more sinister intentions. DPA can, for example, be used by attackers to extract cryptographic keys from cryptographic hardware by statistically correlating power consumption measurements (e.g., power signatures) recorded during processing of a cryptographic algorithm to specific intermediate operations of the cryptographic algorithm. The cryptographic hardware may, for example, be used to protect highly sensitive communications such as military communications or satellite communications. By isolating the specific intermediate operations that comprise the cryptographic algorithm, attackers can gain an understanding of how the cryptographic algorithm operates, and based on this understanding, the attackers can deconstruct the cryptographic algorithm incrementally until a cryptographic key can be successfully extracted. In some instances, even 128-bit and 256-bit encryption may be vulnerable to deconstruction via DPA.

SUMMARY

In general, this disclosure describes techniques for preventing, or reducing a likelihood of, successfully using differential power analysis (DPA) to extract information from electronic systems or devices that are used to process data. A method and an apparatus for implementing the DPA protection techniques of this disclosure are described. The techniques described herein can be used to protect information related to any system or device that includes a processing unit that causes observable power fluctuations when processing data.

In particular, the DPA protection techniques of this disclosure can be used to mask a readily apparent or otherwise discernible power signature generated by a processing unit included within an electronic system or device. The readily apparent or otherwise discernible power signature may be characteristic of the processing unit processing the data, and thus, may be used to deconstruct how the processing unit operates. For example, the readily apparent or otherwise discernible power signature may, in some cases, be used by an attacker to determine information relating to the processing unit. Such information may include information related to data processing algorithms being implemented by the processing unit, and such information may be obtained by an attacker using a variety of analytical processes, such as, for example, various statistical analyses. Specifically, the techniques of this disclosure can be used to mask the readily apparent or otherwise discernible power signature by processing the data using multiple processing units in a randomized time-shifted parallel manner. Using these techniques may effectively add random noise to the resulting power signature and prevent, or reduce the likelihood of, the power signature being readily apparent or otherwise discernible. In this manner, the DPA protection techniques described herein may protect the information relating to the system or device from unauthorized access by the attacker.

In one example, a method of processing an input signal is disclosed. The method includes receiving the input signal, generating a plurality of random delay values, and adding the plurality of random delay values to the input signal to generate a plurality of delayed signals, such that each of the plurality of delayed signals is substantially desynchronized relative to one or more other delayed signals of the plurality of delayed signals. The method further includes processing the plurality of delayed signals to generate a plurality of delayed output signals, producing a plurality of output signals corresponding to the plurality of delayed output signals, wherein each of the plurality of output signals is substantially synchronized relative to other output signals of the plurality of output signals, and combining the plurality of output signals to generate a common output signal.

In another example, an apparatus for processing an input signal is disclosed, the apparatus including protection from differential power analysis. The apparatus includes a plurality of random delay units configured to receive the input signal, and a random delay generator configured to generate a plurality of random delay values, wherein the plurality of random delay units are further configured to add the plurality of random delay values to the input signal to generate a plurality of delayed signals, such that each of the plurality of delayed signals is substantially desynchronized relative to one or more other delayed signals of the plurality of delayed signals. The apparatus further includes a plurality of processing units configured to process the plurality of delayed signals to generate a plurality of delayed output signals, a plurality of random delay removal units configured to add a plurality of additional delay values to the plurality of delayed output signals to produce a plurality of output signals, such that each of the plurality of output signals is substantially synchronized relative to other output signals of the plurality of output signals, and a combination unit configured to combine the plurality of output signals to generate a common output signal.

The details of one or more examples are set forth in the accompanying drawings and the description below. Other features, objects, and advantages in addition to those described below will be apparent from the description and drawings, and from the claims.

DETAILED DESCRIPTION

This disclosure describes techniques for preventing, or reducing a likelihood of, successfully using differential power analysis (DPA) to extract information from electronic systems or devices that are used to process data. A method and an apparatus for implementing the DPA protection techniques of this disclosure are described. The DPA protection techniques described herein can be used to protect information relating to electronic systems and devices that include processing units that cause observable power fluctuations when processing data. In some instances, these power fluctuations may be observed using means that are external to the electronic system or device and may provide an external observer an insight into how the system or device operates. In some examples, the power fluctuations may be represented as an amount of power consumed (e.g., Amperes (A) of current drawn or Watts (W) of power consumed) by the processing unit over a period of time. In this context, the power fluctuations may be referred to as a power consumption profile (or "pattern"), or a "power signature," generated by the processing unit when processing data.

In some instances, a power signature generated by a particular processing unit can be obtained using DPA, and using that power signature, an attacker can extract useful information relating to how the processing unit operates. For example, the attacker may use a readily apparent or otherwise discernible power signature generated by the processing unit to extract information about data processing algorithms being executed by the processing unit. The techniques of this disclosure can, in some instances, cause a processing unit to render a power signature that is not indicative of data processing algorithms being performed by the processing unit, and therefore, a power signature produced using techniques of this disclosure may be of little or no help to an attacker trying to perform DPA. As some examples, using the techniques of this disclosure, the attacker may be unable to use the resultant power signature to determine one or more of a cryptographic code or key or a cryptographic sequence used to encrypt or decrypt data.

The techniques of this disclosure may, in some cases, effectively add what appears as random noise to the resulting power signature of a device, and thus prevent, or reduce the likelihood of, the power signature being indicative of a data processing algorithm being performed by a processing unit of the device. In this manner, the DPA protection techniques described herein may protect information relating to the processing unit, and therefore the system or device, from unauthorized access by the attacker.

Figure 1:
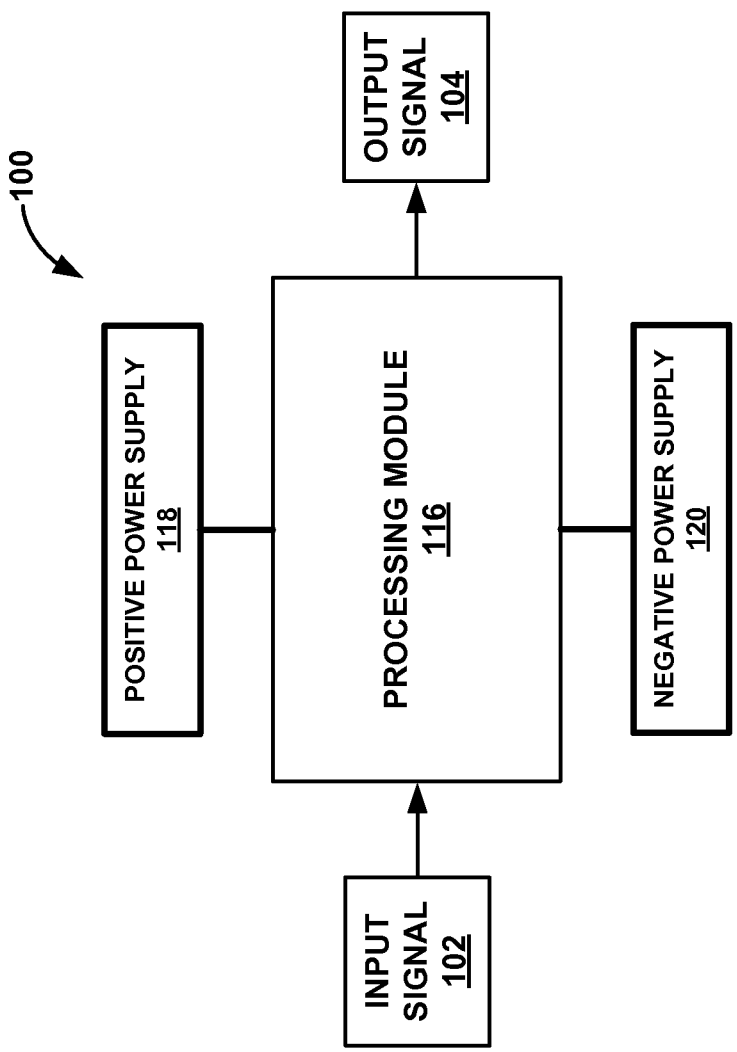
FIG. 1 is a block diagram that illustrates one example of an apparatus for differential power analysis protection, consistent with the techniques of this disclosure.

FIG. 1 is a block diagram that illustrates an example of an apparatus 100 for implementing the DPA protection techniques of this disclosure. Apparatus 100 includes a processing module 116, an input signal 102, a common output signal 104, a positive power supply 118, and a negative power supply 120. Apparatus 100 may be an electronic system or device of any kind, including any combination of discrete electronic components, digital and/or analog circuitry, and electronic sub-systems or sub-devices of any kind. Processing module 116 processes input signal 102 to generate common output signal 104. The processing performed by processing module 116 may, for example, correspond to processing module 116 operating in accordance with input signal 102, processing module 116 manipulating input signal 102, or processing module 116 using input signal 102 to manipulate other data, in any way. This may include, for example, processing module 116 executing one or more instructions defined by input signal 102, processing module 116 manipulating data included within input signal 102 (e.g., using digital signal processing (DSP) techniques or analog circuitry to perform amplification, filtering, etc., of input signal 102) by executing one or more instructions, using information (e.g., reference information) included within input signal 102 to manipulate other data, or any combination thereof. In other words, according to the techniques of this disclosure, processing module 116 may include any combination of digital and/or analog signal processing functionality used to process input signal 102 to generate common output signal 104.

Processing module 116 may comprise any suitable arrangement of hardware, software, firmware, or any combination thereof, to perform the techniques attributed to processing module 116 in this disclosure. Examples of components that may be included within processing module 116 are described in greater detail in FIG. 2. In general, processing module 116 may include any of one or more microprocessors, microcontrollers, digital signal processors (DSPs), application specific integrated circuits (ASICs), field programmable gate arrays (FPGAs), or any other equivalent integrated or discrete logic circuitry, as well as any combination of such components. Furthermore, processing module 116 may include various types of analog circuitry, in addition to, or in place of, the logic devices and circuitry described above.

Although processing module 116, input signal 102, common output signal 104, positive power supply 118, and negative power supply 120 of apparatus 100 are described as separate units or modules for conceptual purposes, in some examples, processing module 116, input signal 102, common output signal 104, positive power supply 118, and negative power supply 120 can be functionally integrated. For instance, each of input signal 102 and common output signal 104 may comprise one or more input and output (I/O) terminals of processing module 116, or one or more other components included within apparatus 100 (e.g., one or more discrete receiver/transmitter, or "transceiver," devices) used for receiving an input signal and/or for transmitting an output signal.

Additionally, positive power supply 118 and negative power supply 120 may comprise a power supply unit or module also included within apparatus 100, which may, in some examples, be integrated with processing module 116 within a common enclosure (e.g., an integrated circuit package if processing module 116 comprises one or more microprocessors, microcontrollers, ASICs, DSPs, or FPGAs), or on a common printed circuit board (PCB). Positive power supply 118 and negative power supply 120 are intended to represent a high voltage and a low voltage respectively, such that there is a voltage difference between positive power supply 118 and negative power supply 120. Examples of voltages for positive power supply 118 and negative power supply 120 include +/−1.2 VDC, +/−1.8 VDC, +/−2.5 VDC, +/−3.3 VDC, +/−5.0 VDC, +/−12 VDC, +/−24 VDC, although other voltages may also be used. In some configurations, one of positive power supply 118 and negative power supply 120 may be 0 VDC, i.e. "ground." In some examples consistent with the techniques of this disclosure, any such voltages of positive power supply 118 and negative power supply 120 may be observed in order to monitor the power consumption of apparatus 100, e.g., using means external to apparatus 100. Moreover, apparatus 100 and all components thereof may be enclosed within an integrated circuit package and comprise one or more microprocessors, microcontrollers, ASICs, DSPs, or FPGAs.

As previously described, input signal 102 may include, for example, one or more instructions to be executed by apparatus 100 (e.g., by processing module 116), data to be manipulated by apparatus 100 by executing one or more instructions, other information, e.g., reference information, that may be used by apparatus 100 to manipulate other data, as well as any combination thereof. As also previously described, apparatus 100, and in particular, processing module 116, may process input signal 102 to generate common output signal 104. In this disclosure, the instructions, data, or other information received via input signal 102, and input signal 102, are used interchangeably to refer to the instructions, data, and information, as well as to the physical system or device used to receive the instructions, data, and information e.g., one or more I/O terminals or transceiver devices, as previously described). Similarly, the information output via common output signal 104, and common output signal 104, are also used interchangeably to refer to the information, as well to as the physical system or device used to output the information (e.g., once again, the one or more I/O terminals or transceiver devices, as previously described).

Additionally, in this disclosure, any reference made to a memory, or a memory device, used to store instructions, data, or other information, includes any volatile or non-volatile media, such as random access memory (RAM), read only memory (ROM), non-volatile RAM (NVRAM), electrically erasable programmable ROM (EEPROM), FLASH memory, and the like. In some examples, one or more memory devices may be external to apparatus 100 and/or processing module 116, for example, external to an enclosure (e.g., an integrated circuit package) or PCB used to enclose or house apparatus 100 and/or processing module 116. For example, apparatus 100 and/or processing module 116 may comprise one or more semiconductor devices, and may be enclosed within an integrated circuit package or housed on a common PCB, as described above. In these examples, the one or more memory devices may be external to the integrated circuit package but on the common PCB, or be external to both the integrated circuit package and the common PCB, relative to apparatus 100 and/or processing module 116. In other examples, the one or more memory devices may be internal to apparatus 100 and/or processing module 116, e.g., included within a common integrated circuit package.

Various characteristics of apparatus 100, and, in particular, of processing module 116, may constitute sensitive or confidential information to which access is restricted by law or regulation to particular groups of persons. Such characteristics may include, for example, the number and type of components included within processing module 116, a configuration of the components within processing module 116, or any other information that may be characteristic of processing module 116 or its underlying operation in any way. For example, such characteristic information may include one or more cryptographic codes or sequences used by processing module 116 to process data, as described above. Protecting such information from unauthorized access may help reduce unauthorized technology transfer, help protect any technological advantage provided to a particular entity from the knowledge and/or use of the information, as well as help protect technological competitiveness afforded by the use of the information. Protecting the various characteristics of apparatus 100, and, in particular, of processing module 116, may help prevent or minimize the possibility that apparatus 100 and/or processing module 116 may be reverse-engineered, and thus may prevent or minimize the possibility of one or more cryptographic codes or sequences used by processing module 116 becoming compromised.

In some examples, such protection may be obtained by decreasing the accessibility to the underlying sensitive and confidential aspects and features of apparatus 100 and/or processing module 116. For example, this may be performed by preventing, or reducing a likelihood, of tampering with apparatus 100 in order to protect the sensitive and confidential aspects thereof.

In general, various techniques can be used to help prevent tampering with electronic systems or devices, such as apparatus 100. In some examples, in cases where apparatus 100 and/or processing module 116 are integrated into a single microprocessor, microcontroller, ASIC, DSP, or FPGA, one or more components of apparatus 100 and/or processing module 116 may be included within an integrated circuit package, as described above. The integrated circuit package in which the one or more components are contained (e.g., partially or completely enclosed) can act as a physical barrier that protects the one or more components from unauthorized access.

In addition, in other examples, an electronic tamper sensor may be integrated into an integrated circuit package, into an enclosure, or onto a PCB, in which apparatus 100 and/or processing module 116 may be enclosed or housed. The electronic tamper sensor may be configured to detect tampering with apparatus 100 or any components thereof (e.g., processing module 116), such as by detecting physical movement or mechanical stress experienced by one or more of the components, and the like. The electronic tamper sensor may be configured to take one or more actions in response to a detection of tampering. For example, the electronic tamper sensor may be configured to terminate operation of apparatus 100 and/or processing module 116, and, in some cases, generate (e.g., issue immediately, or store for later retrieval, or "log") a notification to a user of apparatus 100 indicating the detection of tampering. Additionally, in some cases, apparatus 100 may be configured to cause data (e.g., cryptographic codes or sequences, algorithms, or other confidential information) stored within apparatus 100 to be inaccessible, such as by physical, chemical, or electrical destruction, or by deletion, of the stored data from one or more memories, or memory devices, included within apparatus 100.

However, various additional techniques exist that may enable an attacker to tamper with an electronic system or device without making direct contact with the system or device or any of its components. For example, a number of techniques commonly referred to as "power analysis" may be used to extract useful information from an electronic system or device used to process data, including, for example, confidential information stored within the device (e.g., cryptographic codes or sequences, algorithms, and other confidential information), as well as information regarding the system or device itself, such as the type and number of components included within the system or device, a configuration of the components within the system or device, or any other information that may characterize the system or device in some manner.

One example of such techniques is simple power analysis, which involves visual examination of an amount of power consumed (e.g., Amperes (A) of current drawn or Watts (W) of power consumed) by an electrical system or device (e.g., apparatus 100 and/or processing module 116) over a period of time while processing data (e.g., input signal 102). The power consumption of the system or device may be monitored using means external to the system or device itself. For example, the system or device may consume different amounts of power while performing different operations, for example, during different stages of processing the data, such that the system or device performing some of the operations may result in relatively greater or lower power consumption compared to the system or device performing other operations. Accordingly, variations in the amount of power consumed by the system or device over the course of processing the data, which may be referred to as a power consumption profile (or pattern), or a power signature, as previously described, may be indicative or characteristic of the different operations performed by the system or device in processing the data.

As a result, in some examples, if the system or device is a cryptographic system or device that is operable to encrypt or decrypt input data to provide encrypted or decrypted output data, respectively, an attacker may be able to extract encryption keys, encryption algorithms, or other sensitive or confidential information stored within the system or device using such power signatures generated by the system or device. As one example, in some cryptographic systems or devices, a unique (e.g., readily apparent or otherwise discernible) power signature may alert an attacker to the cryptographic standard being used by the system or device. Additionally, in other examples, the attacker may be able to extract information regarding the number and type of components included within the system or device, a configuration of the components within the system or device, or other information that characterizes the system or device in some manner, using the power signatures.

Another example of such power analysis techniques is DPA, in which an attacker may extract useful information from an electronic system or device by analyzing an amount of power consumed by the system or device over multiple data processing cycles. Once again, the power consumption of the system or device may be monitored using means external to the system or device itself. DPA may be a more advanced form of power analysis compared to simple power analysis described above, because an attacker may be able to compute intermediate values within cryptographic computations by statistically analyzing data collected from multiple cryptographic operations. DPA attacks may be successful when an attacker is able to accumulate a statistically significant quantity of power consumption samples (or patterns), or power signatures, as previously described, over repeated cryptographic encryption/decryption operations using a same stimulus (e.g., input signal 102), or a variety of stimuli. Similarly, using DPA, the attacker may be able to gain insight into the internal makeup of the system or device, including the type and number of components included within the system and device, their configuration, or other information, by statistically analyzing the multiple power signatures.

Still other types of power analysis techniques may include correlation power analysis and template attacks. Correlation power analysis is similar to DPA, and includes techniques by which an attacker may determine secret encryption keys, or cryptographic codes, stored within a system or device by correlating instantaneous power consumption of the system or device to predicted nominal power consumption values. A template attack may be used by an attacker to evaluate noise emanating from an integrated circuit, wherein the noise may be expected to follow a Gaussian distribution. The attacker may sample noise from the integrated circuit and compare the sampled noise against a probabilistic noise profile, the results of which the attacker may then use to reveal secret encryption keys, or cryptographic codes, stored within a system or device.

As described above, the techniques of this disclosure are directed to preventing, or reducing a likelihood of, extraction of information from electronic systems or devices used to process data using DPA techniques. As previously explained, the techniques may be used to mask a readily apparent or otherwise discernible power signature generated by a system or device including a processing unit as a result of the processing unit processing data. This may be accomplished by processing the data using multiples of the processing unit in a randomized time-shifted parallel manner, which may effectively add random noise to the power signature and prevent, or reduce the likelihood of, the power signature being readily apparent or otherwise discernible. As a result, information regarding the system or device may, in some cases, be protected from unauthorized access by an attacker.

According to the techniques of this disclosure, as one example, a plurality of random delay units included within processing module 116 of apparatus 100 may be configured to receive input signal 102. A random delay generator also included within processing module 116 may be configured to generate a plurality of random delay values. In this example, the plurality of random delay units may be further configured to add the plurality of random delay values to input signal 102 to generate a plurality of delayed signals, such that each of the plurality of delayed signals is substantially desynchronized relative to one or more other delayed signals of the plurality of delayed signals. Furthermore, a plurality of processing units also included within processing module 116 may be configured to process the plurality of delayed signals to generate a plurality of delayed output signals. Additionally, a plurality of random delay removal units also included within processing module 116 may be configured to add a plurality of additional delay values to the plurality of delayed output signals to produce a plurality of output signals, such that each of the plurality of output signals is substantially synchronized relative to other output signals of the plurality of output signals. Finally, a combination unit also included within processing module 116 may be configured to combine the plurality of output signals to generate a common output signal 104, e.g., that corresponds to input signal 102 that is processed by any one of the plurality of processing units. In some examples, processing module 116 may be further configured to output common output signal 104, e.g., for subsequent processing and/or storage of common output signal 104. For example, common output signal 104 may be stored in one or more memories or memory devices, as described above.

In this manner, apparatus 100 of FIG. 1 represents an example of an apparatus for processing an input signal, the apparatus including protection from DPA. The apparatus includes a plurality of random delay units configured to receive the input signal, a random delay generator configured to generate a plurality of random delay values, wherein the plurality of random delay units are further configured to add the plurality of random delay values to the input signal to generate a plurality of delayed signals, such that each of the plurality of delayed signals is substantially desynchronized relative to one or more other delayed signals of the plurality of delayed signals, a plurality of processing units configured to process the plurality of delayed signals to generate a plurality of delayed output signals, a plurality of random delay removal units configured to add a plurality of additional delay values to the plurality of delayed output signals to produce a plurality of output signals, such that each of the plurality of output signals is substantially synchronized relative to other output signals of the plurality of output signals, and a combination unit configured to combine the plurality of output signals to generate a common output signal.

Figure 2:
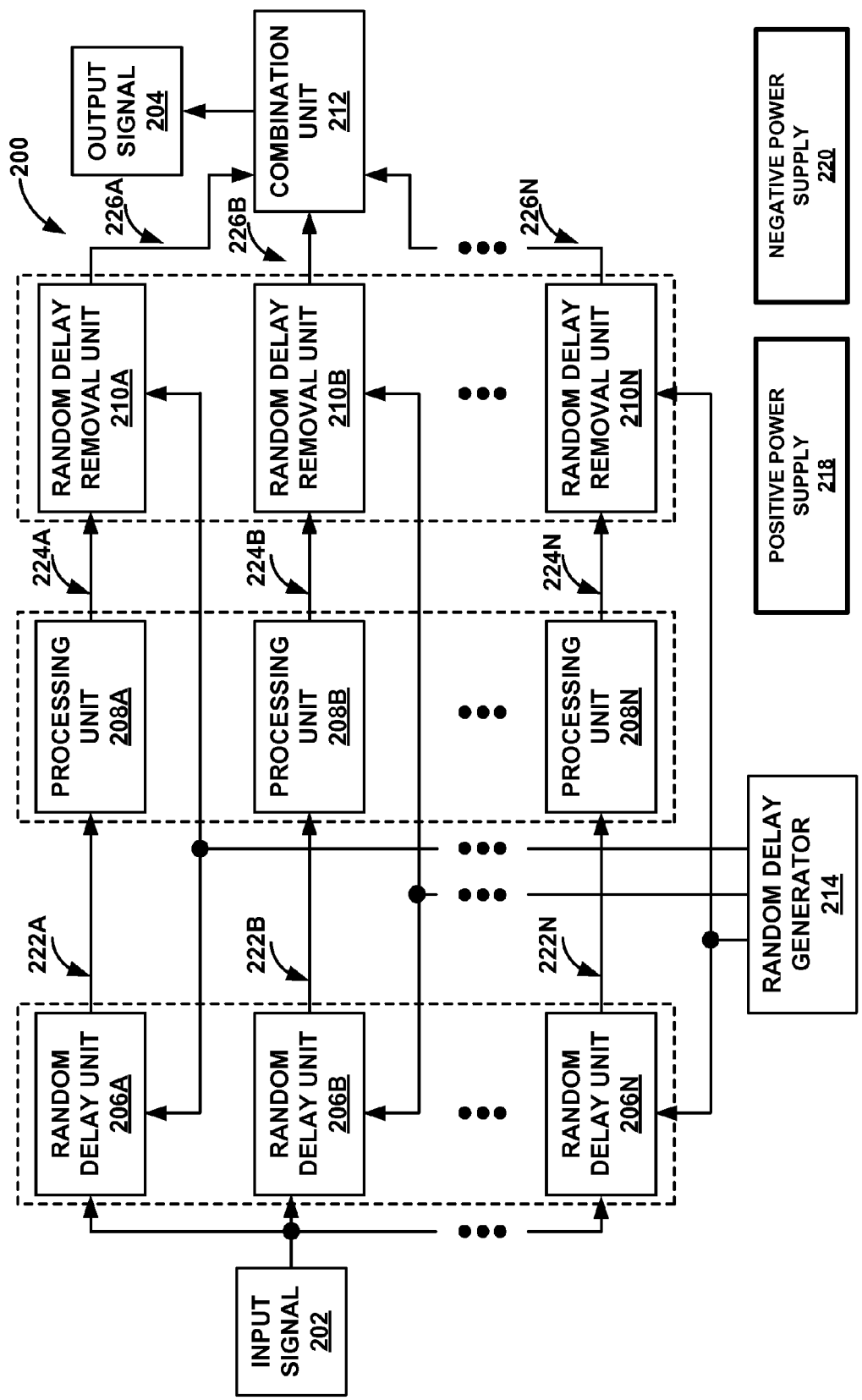
FIG. 2 is a detailed block diagram that illustrates one example of the apparatus for differential power analysis protection of FIG. 1, consistent with the techniques of this disclosure.

FIG. 2 is a block diagram that illustrates one example of apparatus 100 of FIG. 1, which can implement the DPA protection techniques of this disclosure. As shown in FIG. 2, an apparatus 200 includes an input signal 202, a plurality of random delay units 206A-206N, a random delay generator 214, a plurality of processing units 208A-208N, a plurality of random delay removal units 210A-210N, a combination unit 212, a common output signal 202, a positive power supply 218, and a negative power supply 220. As also shown in FIG. 2, apparatus 200 further includes a plurality of delayed signals 222A-222N, a plurality of delayed output signals 224A-224N, and a plurality of output signals 226A-226N.

In some examples, each of processing units 208A-208N may comprise one or more microprocessors, microcontrollers, DSPs, ASICs, FPGAs, or any other equivalent integrated or discrete logic circuitry, as well as any combination of such components. In other examples, each of processing units 208A-208N may further comprise multiple discrete or integrated components, such as one or more co-processors, memories or memory devices, and various peripheral devices (e.g., communication devices, I/O devices, and so forth) used in conjunction with the respective processing unit for processing data. Furthermore, each of processing units 208A-208N may include various types of analog circuitry, in addition to, or in place of, the logic devices and circuitry described above. Additionally, in some examples, processing units 208A-208N may be integrated within a common module or unit, as depicted by the dashed lines surrounding processing units 208A-208N in FIG. 2. In any case, the DPA protection techniques of this disclosure can be used to mask a readily apparent or otherwise discernible power signature generated by any of processing units 208A-208N as a result of processing data, whether the respective processing unit comprises a single (e.g., "stand-alone") processing unit, or a processing unit that includes multiple components, as described above.

According to the techniques of this disclosure, apparatus 200 may be configured to process input signal 202 in a manner that provides protection from DPA, as described above. For example, random delay units 206A-206N may be configured to receive input signal 202. In some examples, random delay units 206A-206N also may be integrated within a common module or unit, as depicted by the dashed lines surrounding random delay units 206A-206N in FIG. 2. Random delay generator 214 may be configured to generate a plurality of random delay values (not shown). Additionally, random delay units 206A-206N may be further configured to add the plurality of random delay values to input signal 202 to generate delayed signals 222A-222N, also depicted in FIG. 2, such that each of delayed signals 222A-222N is substantially desynchronized relative to one or more other delayed signals of delayed signals 222A-222N.

In this example, processing units 208A-208N may be configured to process delayed signals 222A-222N to generate delayed output signals 224A-224N, also depicted in FIG. 2. Random delay removal units 210A-210N may be configured to add a plurality of additional delay values (also not shown) to delayed output signals 224A-224N to produce output signals 226A-226N, such that each of output signals 226A-226N is substantially synchronized relative to other output signals of output signals 226A-226N. Once again, in some examples, random delay removal units 210A-210N also may be integrated within a common module or unit, as depicted by the dashed lines surrounding random delay removal units 210A-210N in FIG. 2. Additionally, in some examples, random delay generator 214 may be configured to generate the plurality of additional delay values. Finally, combination unit 212 may be configured to combine output signals 226A-226N to generate common output signal 204. For example, common output signal 204 may correspond to input signal 202 that is processed by any one of processing units 208A-208N. In some cases, apparatus 200 may be further configured to output common output signal 204, e.g., for subsequent processing and/or storage of common output signal 204. As one example, input signal 202 may include data in an encrypted form, and output signal 204 may include data in an unencrypted form. As another example, input signal 202 may include data in an unencrypted form, and output signal 204 may include data in an encrypted form.

In some examples, each of random delay units 206A-206N may be configured to add one of the plurality of random delay values to input signal 202 to generate one of delayed signals 222A-222N. Similarly, in other examples, each of processing units 208A-208N may be configured to process one of delayed signals 222A-222N to generate one of delayed output signals 224A-224N. Finally, in still other examples, each of random delay removal units 210A-210N may be configured to add one of the plurality of additional delay values to one of delayed output signals 224A-224N to produce one of output signals 226A-226N.

In these examples, the added one of the plurality of additional delay values may correspond to a difference between one of the plurality of random delay values that was added to input signal 202 to generate one of delayed signals 222A-222N that was in turn processed to generate the one of delayed output signals 224A-224N, and a largest one of the plurality of random delay values. Stated another way, the particular additional delay value that may be added to a given delayed output signal (224A-224N) to produce a given output signal (226A-226N) may equal to a difference between a largest one of the random delay values that were generated, and a random delay value that was added to the input signal (202) to generate a given delayed signal (222A-222N) that was in turn processed to generate the delayed output signal (224A-224N). The techniques described above have the effect of "undoing" the random delay values originally added to generate the delayed signals (222A-222N) by effectively further delaying all delayed output signals (224A-224N) such that the resulting (i.e., the produced) output signals (226A-226N) are no longer delayed with respect to one another.

In some examples, one or more of random delay units 206A-206N and random delay removal units 210A-210N may comprise one or more analog or digital delay lines, or their equivalents. In these examples, each of the one or more delay lines may be configured to delay input signal 202 by a corresponding one of the plurality of random delay values in order to generate a corresponding one of delayed signals 222A-222N. Similarly, each of the one or more delay lines may be configured to delay one of delayed output signals 224A-224N by a corresponding one of the plurality of additional delay values to produce a corresponding one of output signals 226A-226N. In other words, according to some examples consistent with the techniques of this disclosure, to add one of the plurality of random delay values to input signal 202 to generate one of delayed signals 222A-222N, each of random delay units 206A-206N may be configured to control a corresponding one of the one or more delay lines such that input signal 202 is delayed by the one of the plurality of random delay values. Similarly, to add one of the plurality of additional delay values to one of delayed output signals 224A-224N to produce one of output signals 226A-226N, each of random delay removal units 210A-210N may be configured to control a corresponding one of the one or more delay lines, or their equivalents, such that the one of delayed output signals 224A-224N is delayed by the one of the plurality of additional delay values.

In other examples, one or more of random delay units 206A-206N and random delay removal units 210A-210N may comprise one or more first-in-first-out (FIFO) devices, e.g., configured to store one or more of input signal 202, delayed signals 222A-222N, delayed output signals 224A-224N, and output signals 226A-226N. In these examples, instead of controlling delay lines or their equivalents in the manner described above, one or more of random delay units 206A-206N and random delay removal units 210A-210N may be configured to control the one or more FIFO devices such that, e.g., input signal 202, which may be first input into the one or more FIFO devices, is delayed by an amount that is equal to a corresponding one of the plurality of random delay values, to generate a corresponding one of delayed signals 222A-222N. Similarly, one or more of random delay units 206A-206N and random delay removal units 210A-210N may be configured to control the one or more FIFO devices such that, e.g., one of delayed output signals 224A-224N, which may be first input into the one or more FIFO devices (e.g., from a corresponding one of processing units 208A-208N), or which may be already stored within the one or more FIFO devices, is delayed by an amount that is equal to a corresponding one of the plurality of additional delay values, to produce a corresponding one of output signals 226A-226N. In these examples, the one or more of random delay units 206A-206N and random delay removal units 210A-210N may be configured to delay the respective ones of input signal 202 and delayed output signals 224A-224N using one or more memory pointers (e.g., memory addresses) within the one or more FIFO devices to delay each signal by a corresponding delay value. For example, the one or more FIFO devices may be implemented one or more memories, or memory devices, within one or more processor registers, or within other comparable devices.

In some examples, each of processing units 208A-208N may comprise the same processing unit. For example, processing units 208A-208N may comprise identical, or substantially similar, processing units. Similarly, in other examples, each of random delay units 206A-206N and random delay removal units 210A-210N may comprise a same delay unit. For example, random delay units 206A-206N and random delay removal units 210A-210N may comprise identical, or substantially similar, delay units. Alternatively, random delay units 206A-206N may comprise identical, or substantially similar, delay units, and random delay removal units 210A-210N may comprise identical, or substantially similar, delay units, while each of random delay units 206A-206N may be different from each of random delay removal units 210A-210N. In some examples, one or more of random delay units 206A-206N and random delay removal units 210A-210N may be implemented using any of one or more discrete analog or digital delay devices, processor registers, memories, or memory devices, and so forth, e.g., in the manner described above with reference to delay lines and FIFOs.

In some examples, to combine output signals 226A-226N to generate common output signal 204, combination unit 212 may be configured to combine output signals 226A-226N using one or more of the following techniques: a) majority voting; b) unanimous voting; and c) selecting a most frequently occurring signal of output signals 276A-226N as common output signal 204, which may, in some examples, be referred to as "mode" voting (i.e., a mode, or a most frequently occurring signal of output signals 226A-226N, may be selected as common output signal 204). In other examples, combination unit 212 may use various other techniques to combine output signals 226A-226N to generate common output signal 204.

In some examples, apparatus 200 may be configured to use the plurality of random delay values to process one or more subsequently received input signals, e.g., input signals received after receiving and processing input signal 202, as described above. Alternatively, random delay generator 214 may be configured to generate a different plurality of random delay values not shown) upon receiving each input signal, e.g., input signal 202 and any subsequently received input signal. In these examples, apparatus 200 may be configured to use the generated "different" plurality of random delay values to process the respective input signal. For example, random delay generator 214 may be configured to generate a different plurality of random delay values at random times, such that, upon receiving each input signal, e.g., any of input signal 202 and any subsequently received input signal, the plurality of random delay values used by apparatus 200 to process the respective input signal may vary in a random manner. In other words, in some configurations, the random delay values generated by random delay generator 214 may change based on input signal 202, but in other configurations the random delay values generated by random delay generator 214 may vary independent of input signal 202, as a function of time for example.

As illustrated by the examples above, apparatus 200 processing input signal 202 to generate common output signal 204 in the manner described may, in some cases, prevent, or reduce a likelihood of, apparatus 200 generating a readily apparent or otherwise discernible power signature that is indicative of input signal 202 being processed by any one of processing units 208A-208N. As previously described, such a readily apparent or otherwise discernible power signature may, in some cases, be used as part of DPA to characterize input signal 202 being processed by one or more of processing units 208A-208N in some manner. Accordingly, by preventing, or reducing a likelihood of, apparatus 200 generating such a readily apparent or otherwise discernible power signature while processing input signal 202 to generate common output signal 204, the techniques of this disclosure may provide DPA protection.

In this manner, apparatus 200 of FIG. 2 represents an example of an apparatus for processing an input signal, the apparatus including protection from DPA, the apparatus comprising a plurality of random delay units configured to receive the input signal, a random delay generator configured to generate a plurality of random delay values, wherein the plurality of random delay units are further configured to add the plurality of random delay values to the input signal to generate a plurality of delayed signals, such that each of the plurality of delayed signals is substantially desynchronized relative to one or more other delayed signals of the plurality of delayed signals, a plurality of processing units configured to process the plurality of delayed signals to generate a plurality of delayed output signals, a plurality of random delay removal units configured to add a plurality of additional delay values to the plurality of delayed output signals to produce a plurality of output signals, such that each of the plurality of output signals is substantially synchronized relative to other output signals of the plurality of output signals, and a combination unit configured to combine the plurality of output signals to generate a common output signal.

Figure 3:
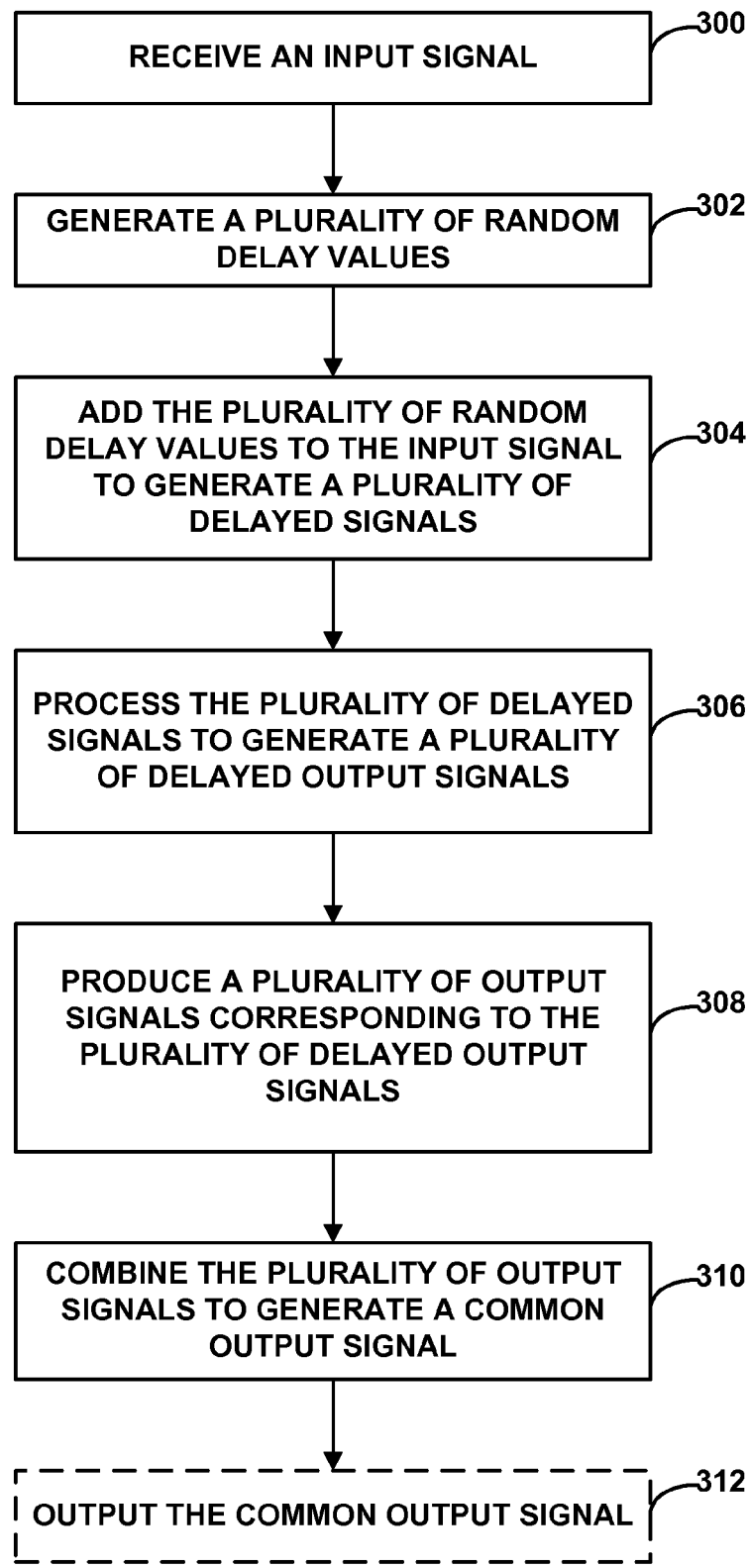
FIG. 3 is a flow diagram that illustrates one example of a method of differential power analysis protection, consistent with the techniques of this disclosure.

FIG. 3 is a flow diagram that illustrates one example of a method of DPA protection, consistent with the techniques of this disclosure. The techniques of FIG. 3 may generally be performed by any processing unit or processor, whether implemented in hardware, software, firmware, or any combination thereof, and when implemented in software or firmware, corresponding hardware may be provided to execute instructions for the software or firmware. For purposes of example, the techniques of FIG. 3 are described with respect to apparatus 100 (FIG. 1) and apparatus 200 (FIG. 2), as well as various components thereof, although it should be understood that other systems or devices may be configured to perform similar techniques. Moreover, the steps illustrated in FIG. 3 may be performed in a different order or in parallel, and additional steps may be added and certain steps omitted, without departing from the techniques of this disclosure.

Initially, a processing module (116) may receive, by a plurality of random delay units (206A-206N) included within the processing module, an input signal (102, 202) (300). As previously described, the input signal may include instructions to be executed by the processing module, data to be manipulated by the processing module by executing one or more instructions, any other information to be used by the processing module to manipulate other data, or any combination thereof.

The processing module may further generate a plurality of random delay values, for example, using a random delay generator (214) also included within the processing module (302). The processing module may still further add, via the plurality of random delay units, the plurality of random delay values to the input signal to generate a plurality of delayed signals (222A-222N), such that each of the plurality of delayed signals is substantially desynchronized relative to one or more other delayed signals of the plurality of delayed signals (304).

Subsequently, the processing module may process, via a plurality of processing units (208A-208N) also included within the processing module, the plurality of delayed signals to generate a plurality of delayed output signals (224A-224N) (306). The processing module may further, e.g., add, via a plurality of random delay removal units (210A-210N) also included within the processing module, a plurality of additional delay values to the plurality of delayed output signals to produce a plurality of output signals (226A-226N). In general, the processing module may produce the plurality of output signals corresponding to the plurality of delayed output signals, wherein each of the plurality of output signals is substantially synchronized relative to other output signals of the plurality of output signals (308). For example, the plurality of additional delay values also may be generated using the random delay generator described above.

Finally, the processing module may combine the plurality of output signals to generate a common output signal (204), e.g., that corresponds to the input signal that is processed by any one of the plurality of processing units (310). For example, the processing module may combine the plurality of output signals using a combination unit (212) also included within the processing module. In some examples, the processing module may further output the common output signal, e.g., for purposes of subsequent processing and/or storage of the common output signal (312).

In some examples, the processing module may use each of the plurality of random delay units to add one of the plurality of random delay values to the input signal to generate one of the plurality of delayed signals. In other examples, the processing module may use each of the plurality of processing units to process one of the plurality of delayed signals to generate one of the plurality of delayed output signals. In still other examples, the processing module may use each of the plurality of random delay removal units to add one of the plurality of additional delay values to one of the plurality of delayed output signals to produce one of the plurality of output signals.

In other examples, however, the processing module may use a subset of the plurality of random delay units to add the plurality of random delay values to the input signal to generate the plurality of delayed signals. Similarly, the processing module may use a subset of the plurality of random delay values to generate the plurality of delayed signals. Furthermore, the processing module may use a subset of the plurality of processing units to process the plurality of delayed signals to generate the plurality of delayed output signals. Also, the processing module may use a subset of the plurality of random delay removal units to add the plurality of additional delay values to the plurality of delayed output signals to produce the plurality of output signals. Finally, the processing module may use a subset of the plurality of additional delay values to produce the plurality of output signals.

In other words, the techniques of this disclosure contemplate various iterations and combinations of using one or more of each of the plurality of random delay units, plurality of random delay values, plurality of processing units, plurality of additional delay values, and plurality of random delay removal units, in processing the input signal to generate the common output signal.

Furthermore, as explained above, to produce the plurality of output signals corresponding to the plurality of delayed output signals, e.g., when using a particular one of the plurality of random delay removal units to add one of the plurality of additional delay values to one of the plurality of delayed output signals to produce one of the plurality of output signals, in some examples, the added one of the plurality of additional delay values may corresponds to a difference between one of the plurality of random delay values that was added to the input signal to generate one of the plurality of delayed signals that was in turn processed to generate the one of the plurality of delayed output signals, and a largest one of the plurality of random delay values. As previously described, in some examples, the plurality of additional delay values may be generated by the random delay generator as part of generating the plurality of random delay values. In other examples, however, the plurality of additional delay values may be generated by another component of the processing module, e.g., using the plurality of random delay values as a reference.

In some examples, each of the plurality of processing units may comprise a same processing unit. In other words, each of the plurality of processing it may be functionally equivalent, or substantially functionally equivalent, to one another. Similarly, in other examples, each of the plurality of random delay units and the plurality of random delay removal units may comprise a same delay unit, i.e., each of the plurality of random delay units and the plurality of random delay removal units may be functionally equivalent, or substantially functionally equivalent, to one another.

In some examples, to combine the plurality of output signals to generate the common output signal, the processing module may use one or more techniques, such as majority voting, unanimous voting, and selecting a most frequently occurring signal of the plurality of output signals as the common output signal (which may, in some examples, be referred to as "mode" voting). In other words, in some cases, the common output signal may correspond to all, a majority, or a most frequently occurring signal, or a "mode," of the plurality of output signals.

In some examples, a different plurality of random delay values may be generated upon receiving each input signal, and used to process the respective input signal in the manner described above. In other words, for each input signal that is received by the processing module (i.e., by the plurality of random delay units), a new set of random delay values may be generated. One advantage of this approach is potentially enhanced DPA protection, wherein a different plurality of random delay values is generated to process each input signal, which may, in some cases, further prevent or reduce the likelihood of generating a power signature that is readily apparent or otherwise discernible. In this example, the plurality of random delay values used by the processing module to process the respective input signal may vary in a random manner. In contrast, in still other examples, the plurality of random delay values generated for the purpose of processing the input signal as described above may be used to process one or more previously or subsequently received input signals. One advantage of this approach is reduced complexity of the processing module, wherein a common plurality of random delay values may be used to process multiple input signals.

The processing module processing the input signal to generate the common out nit signal in the manner described by the examples above may, in some cases, prevent, or reduce a likelihood of, generating a readily apparent or otherwise discernible power signature that is indicative of the input signal being processed by any one of the plurality of processing units included within the processing module. As previously described, in some cases, the readily apparent or otherwise discernible power signature generated by any one of the processing units as a result of the respective processing unit processing the input signal may be used as part of DPA to characterize the input signal being processed by the processing unit in some manner. Accordingly, the techniques of this disclosure aim to prevent, or reduce a likelihood of, this occurring.

In this manner, the method of FIG. 3 represents an example of a method of processing an input signal, including receiving the input signal, generating a plurality of random delay values, adding the plurality of random delay values to the input signal to generate a plurality of delayed signals, such that each of the plurality of delayed signals is substantially desynchronized relative to one or more other delayed signals of the plurality of delayed signals, processing the plurality of delayed signals to generate a plurality of delayed output signals, producing a plurality of output signals corresponding to the plurality of delayed output signals, wherein each of the plurality of output signals is substantially synchronized relative to other output signals of the plurality of output signals, and combining the plurality of output signals to generate a common output signal.

Figure 4:
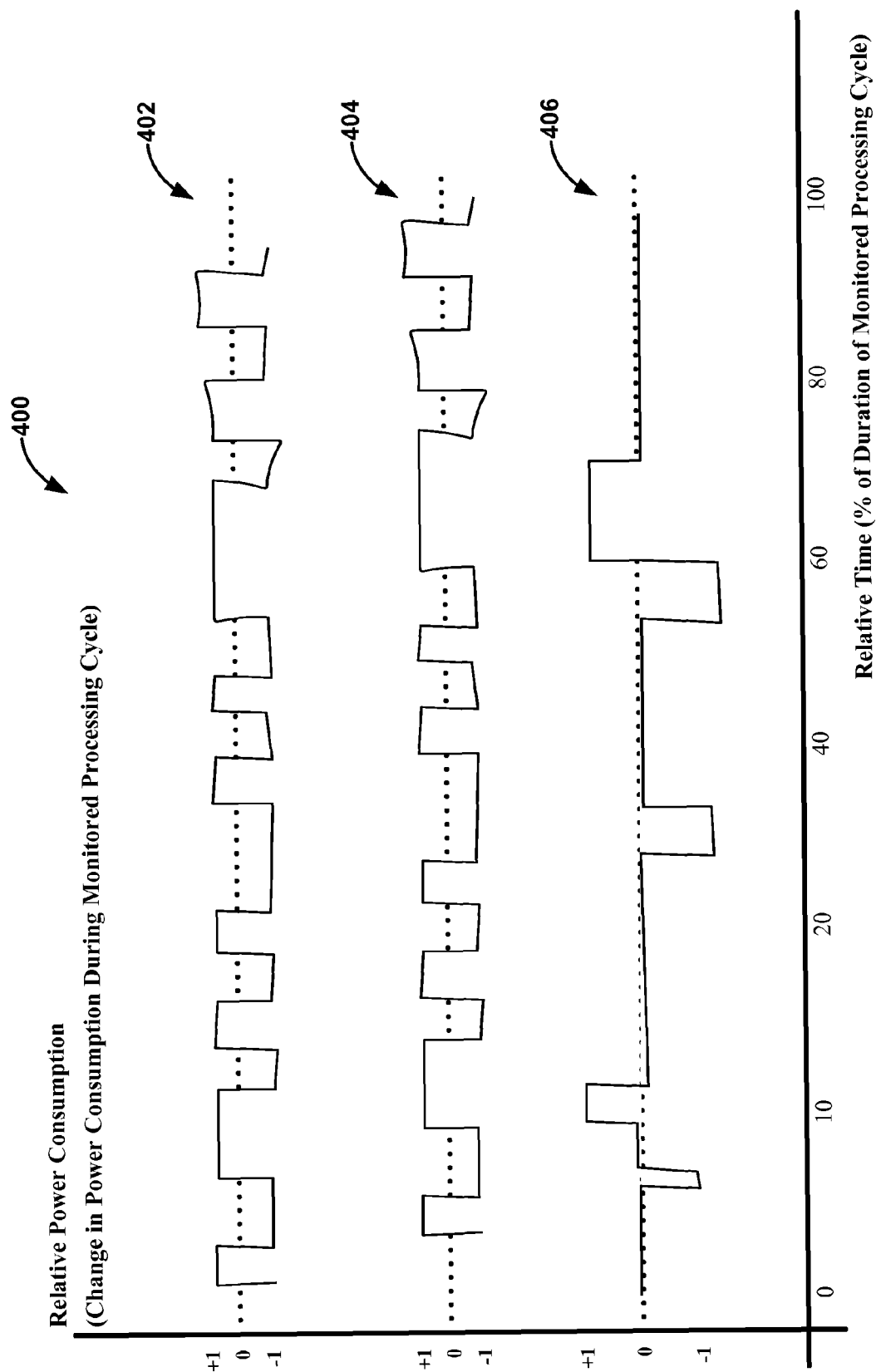
FIG. 4 is a graph that illustrates an example of power signatures generated by two processing units at different points in time, and a sum of the power signatures of the processing it over time, consistent with the techniques of this disclosure.

FIG. 4 is a graph that illustrates an example of power signatures generated by two processing units, and a sum of the power signatures of the processing units over time, consistent with the techniques of this disclosure. In particular, FIG. 4 illustrates a first power signature 402 generated by a first processing unit and a second power signature 404 generated by a second processing unit. Power signatures 402 and 404 may be summed to generate a summed power signature 406. The two processing units process the same input signal (e.g., input signal 102, 202) to generate a common output signal (e.g., common output signal 104, 204) and thus generate similar power signatures, but, as shown in FIG. 4, due to one or more random delays that are added to the input signal prior to the first and second processing units processing the input signal, power signature 404 is time-shifted relative to power signature 402. Due to this time shifting, summed power signature 406 has a unique pattern that is distinct from power signatures 402 and 404. Unlike power signatures 402 and 404, summed power signature 406 is not indicative of any data processing algorithm, and thus is not useful to an attacker trying to deconstruct a data processing algorithm.

Each of the first and second processing units that generate power signatures 402 and 404 may be any one of processing units 208A-208N, as illustrated FIG. 2. As one example, the first processing unit may be processing unit 208A, and the second processing unit may be processing unit 208B. As another example, the first processing unit may be processing unit 208B, and the second processing unit may be processing unit 208N, and so forth. In contrast to the example of FIG. 2, where a plurality, rather than a specific number of processing units (i.e., processing units 208A-208N) is used to process an input signal (i.e., input signal 202) in order to generate a common output signal (i.e., common output signal 204), in the example of FIG. 4, only two processing units (i.e., the first and second processing units) are used to process an input signal in order to generate a common output signal. In other examples, any number of processing units may be used to process the input signal to generate the common output signal, as described above with reference to FIGS. 1-3.

In the example of FIG. 4, the first and second processing units may generate power signatures 402 and 404 by processing the input signal in order to generate the common output signal, as previously described. As shown in FIG. 4, power signatures 402 and 404 are essentially identical power signatures, differing only in that power signature 402 is time-shifted relative to power signature 404. In other words, power signature 402 is generated at a different point in time, or is delayed, relative to power signature 404. In the example of FIG. 4, power signatures 402 and 404 may be generated by identical or substantially similar processing units, the first and second processing units may be identical or substantially similar. Furthermore, in this example, the relative time delay between power signatures 402 and 404 may be generated by adding one or more random delay values to the input signal prior to using the first and second processing units to process the input signal, as also previously described.

In other words, in one example, one random delay value may be added to the input signal, thereby generating a delayed version of the input signal (e.g., any one of delayed signals 222A-222N), and the delayed version of the input signal may be processed by one of the first and second processing units. In this example, the other one of the first and second processing units may process the input signal directly, rather than processing a delayed version of the input signal. Stated another way, with reference to FIG. 2, one of random delay units 206A-206N may receive the input signal, but may not delay the input signal, or, equivalently, may add a random delay value equal to "0" to the input signal, prior to the other one of the first and second processing units processing the input signal. In other words, one of delayed signals 222B-222N may comprise the input signal directly. In another example, two different random delay values may be added to the input signal, thereby generating two different delayed version of the input signal (e.g., any two of delayed signals 222A-222N), and the two different delayed versions of the input signal may be processed by the first and second processing units, respectively. In the above-described examples, adding the one or more random delay values to the input signal prior to using the first and second processing units to process the input signal may result in the relative time delay between power signatures 402 and 404 described above and shown in FIG. 4.

For example, each of the one or more random delay values may be generated by random delay generator 214 and added to the input signal by any one of random delay units 206A-206N to generate two delayed signals (e.g., any two of delayed signals 222A-222N), as illustrated in FIG. 2. Additionally, each of the two delayed signals may be processed by any one of the first and second processing units, as described above, to generate two delayed output signals (e.g., any two of delayed output signals 224A-224N), as also illustrated in FIG. 2. Furthermore, each of the two delayed output signals may be further delayed by adding one or more additional delay values (e.g., also generated by random delay generator 214) using any one of random delay removal units 210A-210N to produce two output signals (e.g., any two of output signals 226A-226N), as also illustrated FIG. 2. Finally, the two output signals may be combined by combination unit 212 to generate the common output signal, as also illustrated in FIG. 2.

In this example, power signatures 402 and 404 are depicted as occurring from a relative time 0 to a relative time 100, in increments of 10, wherein the relative time indicates a percentage of a duration of time required for the first and second processing units to process the input signal to generate the common output signal, thereby also generating power signatures 402 and 404. Additionally, each of power signatures 402 and 404 is depicted as spanning a relative magnitude range of −1 to +1, wherein the magnitude range indicates a relative change in power consumption. Stated another way, any transitions of each of power signatures 402 and 404 within the range of magnitude merely indicate a change, i.e., any change, in power consumption of the corresponding one of the first and second processing units. The relative time duration and relative ranges of magnitude are chosen for purposes of illustration and simplicity, such that no numerical values of time or power consumption are used. In some examples, the relative time duration may comprise multiple nanoseconds (nsec), microseconds msec), or seconds (sec), and the relative ranges of magnitude may comprise multiple nanowatts (nW), milliwatts (mW), or watts (W) (or, alternatively, nanoamperes (nA), milliamperes (mA), or amperes (A)), as only some examples.

As also shown in FIG. 4, power signatures 402 and 404 may be summed to generate a summed power signature 406. The duration of summed power signature 406 in FIG. 4 corresponds to the total time required for the first and second processing units to process the input signal, thereby generating power signatures 402 and 404, as described above, i.e., from the relative time 0 to the relative time 100. In other words, the duration of summed power signature 406 corresponds to a sum of an amount of time required by any one of the first and second processing modules to process the input signal to generate the common output signal, and a longest one of the one or more random delay values added to the input signal prior to processing the input signal. The magnitude of summed power signature 406 also corresponds to a relative magnitude range of −1 to +1, as described above. In this example, although summed power signature 406 represents a sum of power signatures 402 and 404, the magnitude of summed power signature 406 is normalized to fit within the relative magnitude range of −1 to +1. As such, in the example of FIG. 4, any transitions in the magnitude of summed power signature 406 indicate a mere change in magnitude, i.e., any change in magnitude, of one or both of power signatures 402 and 404.

As can be seen in FIG. 4, summed power signature 406 illustrates that, advantageously, power signatures 402 and 404 generated by the first and second processing units are combined, such that none of power signatures 402 and 404 may be readily apparent or otherwise discernible from summed power signature 406. In other words, power signatures 402 and 404 are "masked" as a result of generating summed power signature 406 by summing power signatures 402 and 404. For example, because power signatures 402 and 404 are generated by the first and second processing units by first adding the one or more random delay values to the input signal, as described above, adding power signatures 402 and 404 to generate summed power signature 406 has the effect of adding random noise to any one of power signatures 402 and 404. This has the further effect of masking each of power signatures 402 and 404 within summed power signature 406, thus preventing, or reducing a likelihood, of power signatures 402 and 404 being readily apparent or otherwise discernible to an attacker, as also described above. Accordingly, processing the input signal to generate the common output signal using the first and second processing units in the manner described above may, in some cases, provide DPA protection, as described in the preceding examples of disclosure.

The techniques of this disclosure may be implemented in a wide variety of computer devices. Any components, units, or modules that have been described are provided to emphasize functional aspects, and do not necessarily require realization by different hardware units. The techniques described herein may also be implemented in hardware, software, firmware, or any combination thereof. Any features described as modules, units, or components may be implemented together in an integrated logic device, or separately as discrete but interoperable logic devices. In some cases, various features may be implemented as an integrated circuit device, such as an integrated circuit chip, or chipset.

If implemented in software, the techniques may be realized at least in part by a computer readable storage medium storing instructions. When executed by one or more processors, the instructions can cause the one or more processors to perform one or more of the methods described above. The computer-readable storage medium may comprise a tangible computer-readable storage medium, and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disc (CD), digital versatile disc (DVD), Blu-ray disc, holographic data storage media, or other non-volatile storage device.

The memory, or memory devices, described herein, which may be used as part of the described techniques, may also be realized in any of a wide variety of memory, or memory devices, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

The invention claimed is:

1. A method of processing an input signal, the method comprising:
   receiving the input signal;
   generating a plurality of random delay values;
   adding the plurality of random delay values to the input signal to generate a plurality of delayed signals, such that each of the plurality of delayed signals is desynchronized relative to one or more other delayed signals of the plurality of delayed signals;
   processing the plurality of delayed signals to generate a plurality of delayed output signals, wherein processing the plurality of delayed signals masks a discernable power signature generated by processing any one of the plurality of delayed signals;
   producing a plurality of output signals by adding a plurality of additional delay values to the plurality of delayed output signals, wherein each of the plurality of output signals is synchronized relative to other output signals of the plurality of output signals; and
   combining the plurality of output signals to generate a common output signal, wherein the common output signal corresponds to at least one of the plurality of delayed signals.

2. The method of claim 1, wherein one of the plurality of random delay values is added to the input signal to generate one of the plurality of delayed signals.

3. The method of 1, wherein producing the plurality of output signals corresponding to the plurality of delayed output signals comprises adding one of a plurality of additional delay values to one of the plurality of delayed output signals to produce one of the plurality of output signals, and wherein the added one of the plurality of additional delay values corresponds to a difference between one of the plurality of random delay values that was added to the input signal to generate one of the plurality of delayed signals that was in turn processed to generate the one of the plurality of delayed output signals, and a largest one of the plurality of random delay values.

4. The method of claim 1, wherein combining the plurality of output signals to generate the common output signal comprises combining the plurality of output signals using one or more of the following techniques:
   a) majority voting;
   b) unanimous voting; and
   c) selecting a most frequently occurring signal of the plurality of output signals as the common output signal.

5. The method of claim 1, wherein a different plurality of random delay values is generated upon receiving each input signal, and is used to process the respective input signal.

6. The method of claim 1, wherein the plurality of random delay values is used to process one or more subsequently received input signals.

7. The method of claim 1, wherein the readily apparent or otherwise discernible power signature is used as part of a differential power analysis to characterize the input signal being processed by one of a plurality of processing circuits.

8. An apparatus for processing an input signal, the apparatus including protection from differential power analysis, the apparatus comprising:
   a plurality of random delay circuits configured to receive the input signal;
   a random delay generator configured to generate a plurality of random delay values, wherein the plurality of random delay circuits is further configured to add the plurality of random delay values to the input signal to generate a plurality of delayed signals, such that each of the plurality of delayed signals is desynchronized relative to one or more other delayed signals of the plurality of delayed signals;
   a plurality of processing circuits configured to process the plurality of delayed signals to generate a plurality of delayed output signals, wherein processing the plurality of delayed signals masks a discernable power signature generated by any one of the plurality of processing circuits;
   a plurality of random delay removal circuits configured to add a plurality of additional delay values to the plurality of delayed output signals to produce a plurality of output signals, such that each of the plurality of output signals is synchronized relative to other output signals of the plurality of output signals; and
   a combination circuits configured to combine the plurality of output signals to generate a common output signal, wherein the common output signal corresponds to at least one of the plurality of delayed signals.

9. The apparatus of claim 8, wherein each of the plurality of random delay circuits is configured to add one of the plurality of random delay values to the input signal to generate one of the plurality of delayed signals.

10. The apparatus of claim 8, wherein each of the plurality of processing circuits is configured to process one of the plurality of delayed signals to generate one of the plurality of delayed output signals.

11. The apparatus of claim 8, wherein each of the plurality of random delay removal circuits is configured to add one of the plurality of additional delay values to one of the plurality of delayed output signals to produce one of the plurality of output signals, and wherein the added one of the plurality of additional delay values corresponds to a difference between one of the plurality of random delay values that was added to the input signal to generate one of the plurality of delayed signals that was in turn processed to generate the one of the plurality of delayed output signals, and a largest one of the plurality of random delay values.

12. The apparatus of claim 8, wherein each of the plurality of processing circuits comprises a same processing circuit.

13. The apparatus of claim 8, wherein each of the plurality of random delay circuits and the plurality of random delay removal circuits comprises a same delay circuit.

14. The apparatus of claim 8, wherein to combine the plurality of output signals to generate the common output signal, the combination circuit is configured to combine the plurality of output signals using one or more of the following techniques:
   a) majority voting;
   b) unanimous voting; and
   c) selecting a most frequently occurring signal of the plurality of output signals as the common output signal.

15. The apparatus of claim 8, wherein the random delay generator is configured to generate a different plurality of random delay values upon receiving each input signal, and wherein the generated plurality of random delay values is used to process the respective input signal.

16. The apparatus of claim 8, wherein the plurality of random delay values is used to process one or more subsequently received input signals.

17. The apparatus of claim 8, wherein the readily apparent or otherwise discernible power signature is used as part of a differential power analysis to characterize the input signal being processed by the one of the plurality of processing circuits.

* * * * *